July 31, 1945.  E. S. AKER  2,380,715
SECTIONAL JOURNAL MEANS FOR SHAFTS
Filed March 17, 1944
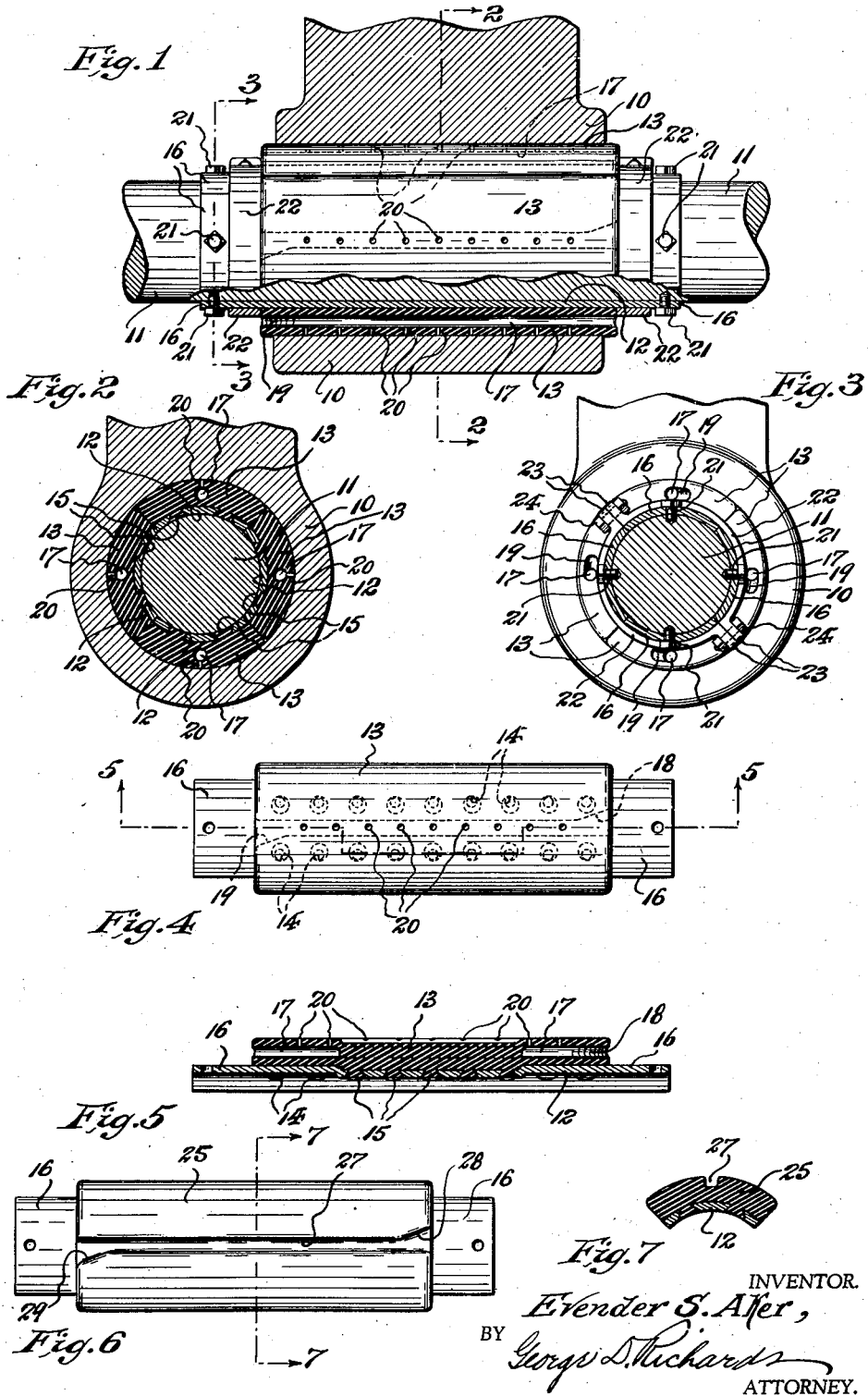
INVENTOR.
Evender S. Aker,
BY
George D. Richards
ATTORNEY.

Patented July 31, 1945

2,380,715

UNITED STATES PATENT OFFICE 2,380,715

SECTIONAL JOURNAL MEANS FOR SHAFTS

Evender S. Aker, Belleville, N. J.

Application March 17, 1944, Serial No. 526,928

8 Claims. (Cl. 308—238)

This invention relates to improvements in means for journaling rotatable shafts in their supporting bearings; and the invention has reference, more particularly, to an improved construction of journal made of non-metallic material, preferably rubber, for rotatably supporting a shaft in its bearing, said journal being provided with means for delivering lubricating water to and between the engaged faces of the journal and the bearing, whereby the journal is self-lubricating, and especially adapted to serve a water submerged shaft, such e. g. as the propeller shaft of a power driven ship or boat; and the invention further relates to a self-lubricating shaft journal means of sectional form especially adapted for application to ship propeller shafts of comparatively large diameters.

This invention has for an object to provide a novel construction of rubber or similar non-metallic journal means for a shaft, which means comprises a plurality of segmental sections capable of being assembled together about the shaft to be served; each said section having a rigid and preferably metallic base member upon which is affixed the rubber or similar non-metallic journal body, and each said body having means to admit of water flow therethrough, whereby, in the use and operation of the journal of which it forms a part, the water is delivered to and between the surfaces of the journal and a cooperating bearing so as to constantly subject such surfaces to water lubrication.

The invention has for another object to provide a self water-lubricated shaft journal means of the sectional type as above characterized, including means for mounting and affixing the same in operative assembled relation to and about a shaft to be served thereby.

Other objects of the invention, not at this time more particularly enumerated, will be understood from the following detailed description of the same.

Illustrative embodiments of the invention are shown in the accompanying drawing, in which:

Fig. 1 is an elevational view in part section of a shaft provided with a self water-lubricated journal, of the sectional type according to this invention, as mounted in a supporting bearing, the latter being shown in section; Fig. 2 is a cross-sectional view of the same, taken on line 2—2 in Fig. 1; Fig. 3 is another cross-sectional view, taken on line 3—3 in Fig. 1; Fig. 4 is a face view of one of the journal sections; and Fig. 5 is a longitudinal sectional view through the journal section of Fig. 4, taken on line 5—5 in the latter figure.

Fig. 6 is a face view of a journal section of modified form; and Fig. 7 is a transverse sectional view therethrough, taken on line 7—7 in Fig. 6.

Similar characters of reference are employed in the above described views, to indicate corresponding parts.

The sectional journal of this invention is adapted to be used upon shafts, and particularly upon shafts of comparatively large diameter, which are submerged in water, as e. g. the external end of a ship or boat propeller shaft, which external end is supported by suitable stern bearing means 10 of any known or desired design. It will be understood however that the sectional shaft journal of this invention may be employed for machinery shafts of other kinds, especially where such shafts are operated under wet conditions, or wholly or partially submerged in water.

According to this invention, the self water-lubricating journal comprises an assembly of segmental journal forming sections, which, when assembled together and affixed to the shaft 11 to be served thereby, provide a complete journal structure adapted to envelop that portion of the shaft which is housed in the supporting bearing 10, and so as to turn with the shaft within said bearing.

Each journal section comprises a base plate 12 of suitable length and of arcuate cross-sectional shape, the curvature of which conforms to the curved surface of the shaft 11 to be served. Said base plate 12 is formed from rigid and strong material, preferably a suitable metal or metallic alloy. Mounted on the external or transversely convex face of the base plate 12 is a journal block 13 of substantial thickness. Said journal block is made of non-metallic material. For example, the same is preferably made of vulcanized rubber or similar non-metallic material of a character adapted to have its surface frictional resistance substantially reduced when wet. I have found that both hard and soft rubber or comparatively soft vulcanized rubber to be very satisfactory in this respect. The journal block 13 is strongly adhered to the base plate 12.

This may be done by vulcanizing the rubber composing the journal body to the metal of the base plate. Preferably, the base plate 12 is provided with a multiplicity of distributively spaced openings 14 therethrough, and in those portions of the area thereof to which the journal block 13 is contiguous. Said openings 14 are preferably provided with undercut edges. When the journal block 13 is molded and vulcanized to the perforate portions of the base plate thus provided, portions of the rubber mass thereof will be caused to penetrate and fill said openings 14, thus providing a multiplicity of tenons 15, whereby to interlock the rubber mass of the journal block with the base plate 12, and thereby strongly anchor said block to the plate against separation or relative displacement. The journal block 13 is made of less length than the base plate 12, whereby when the former is affixed to the latter as described, free end portions 16 of the base plate will respectively extend beyond the respective ends of the journal block 13, for purposes to be presently set forth.

Each journal block 13, in one embodiment thereof shown in Figs. 1 to 5 inclusive, is provided with at least one through passage 17 extending longitudinally from end to end thereof and spaced inwardly from its external bearing surface. Each passage 17 is provided at its outer end with a flared or inclined mouth portion 18, inclined in the forward driving direction of rotation of the shaft upon which the blocks are assembled in journal forming relation, whereby such mouth portions act as scoops to force water in rearward flow through the passage 17, to discharge from a similarly flared or inclined mouth portion 19, which is inclined in the reverse direction of rotation of said shaft. It will be obvious that, in the event said shaft is rotated in reverse direction, said flared or inclined mouth portion 19 will then act as a scoop to force water in forward flow through the passage 17 for discharge at the mouth portion 18. Extending outwardly from each water flow passage 17 through the body of the journal block, to emerge at the external bearing surface thereof, are a plurality of radial water delivery passages 20, whereby to discharge lubricating water upon and between the journal bearing surface and that of the contiguous surface of the bearing 10 in which the journal is rotatably supported.

A suitable number of segmental journal sections of appropriate width are adapted to be assembled together in side by side relation so as to form a complete circular or cylindrical journal structure to envelop the shaft 11 to be served thereby. It will be understood that said segmental journal sections may be sized that, optionally, two or more of the same, when so assembled will complete the shaft enveloping journal structure; for example, as shown in Figs. 1 to 3 inclusive, the journal is completed by an assembly of four segmental journal sections.

When the segmental journal sections are applied in journal forming assembled relation to the shaft 11, the base plates 12 thereof will be supported upon and against the shaft surface. Each segmental journal section of the assembly is preferably individually bound to the shaft, by bolts 21 or like fastening means which are passed therethrough so as to screw into the body of the shaft, as e. g. by passing one or more such bolts or the like through the respective free end portions 16 of the base plate. In addition to such fastening means, said free end portions 16 of the assembled journal section base plates may be embraced by clamp means or bands comprising cooperative yoke members 22 having radial meeting lugs 23 at adjoined ends thereof, through which fastening bolts 24 are engaged, whereby the clamp or band thus formed surrounds and strongly clamps the base plates of the assembled journal sections to the shaft and in journal forming relation one to another. Such method and means of fastening the journal forming assembly to the shaft may be either selectively or conjointly employed, or any other suitable fastening and assembly securing means or method may be employed.

Under operative conditions, with the journal forming sections assembled and secured to the shaft 11 and mounted in supporting bearing means 10, when the shaft is submerged, lubricating water will enter, fill and constantly flow through the flow passages 17 from end to end thereof. As the shaft and journal structure rotate, water from within said passages 17 will be subjected to centrifugal force, whereby delivery of water from the latter outwardly through the radial delivery passages 20 will be induced, and consequently lubricating water will be continuously discharged from the outlets of said delivery passages between and upon the engaged bearing surfaces of the journal structure and the contiguous surface of the bearing 10 in which said journal structure rotates. This action is analogous to a constant pumping action, so that a lubricating film of water is maintained between the opposed surfaces of the bearing and journal structure.

In Figs. 6 and 7 is shown a somewhat modified form of segmental journal section from which the journal structure may be produced, the same comprising a base plate 12, upon the outer convex face of which is affixed, similarly as above described, a journal block 23 made of non-metallic material such as vulcanized rubber. Instead of being provided with a through passage 17 and outwardly extending radial discharge passages 20 leading therefrom, as above described, said journal block 23 is provided in its external face with at least one outwardly open longitudinally extending water flow channel 27, the same being provided at its outer end with a flared or inclined mouth portion 28, inclined in the forward driving direction of journal rotation, and at its rear end with a similar flared or inclined mouth portion 29, inclined in reverse direction of journal rotation, whereby to provide water scooping effects hereinbefore mentioned.

It will be obvious that, when a plurality of the last described modified segmental journal sections are assembled in journal forming relation about a shaft to be served thereby, and thereupon secured to said shaft in the manner previously described, in operation water will be caused to flow through the passages 27, and at the same time, by centrifugal force induced by rotary movement of the journal structure, will be caused to discharge upon and between the opposed surfaces of the journal structure and the bearing in which it is supported, so as to continuously bathe these surfaces with a lubricating film of water.

I am aware that changes could be made in the sectional type journal structure of this invention without departing from the scope of the invention as defined in the following claims. It is therefore intended that all matter contained in the foregoing description or shown in the accompanying drawing shall be interpreted as illustrative and not in a limiting sense.

I claim:

1. A shaft journal structure comprising a plurality of longitudinal journal sections adapted to to be assembled in side by side relation and affixed upon and in surrounding relation to the shaft to be served, each section comprising a rigid bottom plate transversely curved to fit the shaft contour, and a journal body of non-metallic material of conformably transversely curved shape affixed to said bottom plate, said body having at least one water flow passage extending longitudinally therethrough from end to end thereof from which lubricating water may be radially discharged to bathe the external bearing surface of the journal body and the contiguous surface of a supporting bearing in which the journal structure is mounted, said water flow passage having a scoop mouth formation at one end inclined in one direction of shaft and journal structure rotation and a similar scoop mouth formation at its opposite end inclined in the reverse direction of shaft and journal structure rotation.

2. A shaft journal structure comprising a plurality of longitudinal journal sections adapted to be assembled in side by side relation and affixed upon and in surrounding relation to the shaft to be served, each section comprising a rigid bottom plate transversely curved to fit the shaft contour, a rubber journal body of conformably transversely curved shape, said journal body having tenon means of dove-tail cross-section extending from its internal face, said bottom plate having openings therein conforming to the cross-sectional shape of said tenon means for reception thereof whereby to interlock said journal body with said bottom plate, and said body having at least one water flow passage extending longitudinally therethrough from end to end thereof from which lubricating water may be radially discharged to bathe the external bearing surface of the journal body and the contiguous surface of a supporting bearing in which the journal structure is mounted.

3. A shaft journal structure comprising a plurality of longitudinal journal sections adapted to be assembled in side by side relation and affixed upon and in surrounding relation to the shaft to be served, each section comprising a rigid bottom plate transversely curved to fit the shaft contour, a rubber journal body of conformably transversely curved shape, said journal body having tenon means extending from its internal face, said bottom plate having means to receive said tenon means whereby to aid affixture of said journal body to said bottom plate, and said body having at least one water flow passage extending longitudinally therethrough from end to end thereof from which lubricating water may be radially discharged to bathe the external bearing surface of the journal body and the contiguous surface of a supporting bearing in which the journal structure is mounted, said water flow passage having a scoop mouth formation at one end inclined in one direction of shaft and journal structure rotation and a similar scoop mouth formation at its opposite end inclined in the reverse direction of shaft and journal structure rotation.

4. A shaft journal structure comprising a plurality of longitudinal journal sections adapted to be assembled in side by side relation upon and about the shaft to be served, each section comprising a rigid bottom plate transversely curved to fit the shaft contour, a journal body of non-metallic material of conformably transversely curved shape affixed to said bottom plate, said journal body being of less length than said bottom plate, whereby free end portions of the latter extend beyond the ends of the former, said journal body having at least one water flow passage extending longitudinally therethrough from end to end thereof from which lubricating water may be radially discharged to bathe the external bearing surface of the journal body and the contiguous surface of a supporting bearing in which the journal structure is mounted, said water flow passage having a scoop mouth formation at one end inclined in one direction of shaft and journal structure rotation and a similar scoop mouth formation at its opposite end inclined in the reverse direction of shaft and journal structure rotation, and means cooperative with the free end portions of the bottom plates of the assembled journal sections for securing the latter to the shaft and in assembled journal structure formation.

5. A shaft journal structure comprising a plurality of longitudinal journal sections adapted to be assembled in side by side relation upon and about the shaft to be served, each section comprising a rigid bottom plate transversely curved to fit the shaft contour, a rubber journal body of conformably transversely curved shape, said journal body having tenon means extending from its internal face, said bottom plate having means to receive said tenon means whereby to aid affixture of said journal body to said bottom plate, said journal body being of less length than said bottom plate, whereby free end portions of the latter extend beyond the ends of the former, said journal body having at least one water flow passage extending longitudinally therethrough from end to end thereof from which lubricating water may be radially discharged to bathe the external bearing surface of the journal body and the contiguous surface of a supporting bearing in which the journal structure is mounted, and means cooperative with the free end portions of the bottom plates of the assembled journal sections for securing the latter to the shaft and in assembled journal structure formation.

6. A shaft journal structure comprising a plurality of longitudinal journal sections adapted to be assembled in side by side relation upon and about the shaft to be served, each section comprising a rigid bottom plate transversely curved to fit the shaft contour, a rubber journal body of conformably transversely curved shape, said journal body having tenon means extending from its internal face, said bottom plate having means to receive said tenon means whereby to aid affixture of said journal body to said bottom plate, said journal body being of less length than said bottom plate, whereby free end portions of the latter extend beyond the ends of the former, said journal body having at least one water flow passage extending longitudinally therethrough from end to end thereof from which lubricating water may be radially discharged to bathe the external bearing surface of the journal body and the contiguous surface of a supporting bearing in which the journal structure is mounted, and means cooperative with the free end portions of the bottom plates of the assembled journal sections for securing the latter to the shaft and in assembled journal structure formation, said latter means including clamp yoke means encircling said free end portions of the journal section bottom plates.

7. A shaft journal structure comprising a plurality of longitudinal journal sections adapted to be assembled in side by side relation upon and about the shaft to be served, each section comprising a rigid bottom plate transversely curved to fit the shaft contour, a rubber journal body of conformably transversely curved shape, said journal body having tenon means extending from its internal face, said bottom plate having means to receive said tenon means whereby to aid affixture of said journal body to said bottom plate, said journal body being of less length than said bottom plate, whereby free end portions of the latter extend beyond the ends of the former, said journal body having at least one water flow passage extending longitudinally therethrough from end to end thereof from which lubricating water may be radially discharged to bathe the external bearing surface of the journal body and the contiguous surface of a supporting bearing in which the journal structure is mounted, said water flow passage having a scoop mouth formation at one end inclined in one direction of shaft and journal structure rotation and a similar scoop mouth formation at its opposite end inclined in the reverse direction of shaft and journal structure rotation, and means cooperative with the free end portions of the bottom plates of the assembled journal sections for securing the latter to the shaft and in assembled journal structure formation.

8. A shaft journal structure comprising a plurality of longitudinal journal sections adapted to be assembled in side by side relation upon and about the shaft to be served, each section comprising a rigid bottom plate transversely curved to fit the shaft contour, a rubber journal body of conformably transversely curved shape, said journal body having tenon means extending from its internal face, said bottom plate having means to receive said tenon means whereby to aid affixture of said journal body to said bottom plate, said journal body being of less length than said bottom plate, whereby free end portions of the latter extend beyond the ends of the former, said journal body having at least one water flow passage extending longitudinally therethrough from end to end thereof from which lubricating water may be radially discharged to bathe the external bearing surface of the journal body and the contiguous surface of a supporting bearing in which the journal structure is mounted, said water flow passage having a scoop mouth formation at one end inclined in one direction of shaft and journal structure rotation and a similar scoop mouth formation at its opposite end inclined in the reverse direction of shaft and journal structure rotation, and means cooperative with the free end portions of the bottom plates of the assembled journal sections for securing the latter to the shaft and in assembled journal structure formation, said latter means including clamp yoke means encircling said free end portions of the journal section bottom plates.

EVENDER S. AKER.